United States Patent
Varada et al.

(10) Patent No.: US 11,647,080 B1
(45) Date of Patent: May 9, 2023

(54) REAL AND VIRTUAL WORLD MANAGEMENT

(71) Applicant: INTERNATIONAL BUSINESS MACHINES CORPORATION, Armonk, NY (US)

(72) Inventors: Sri Harsha Varada, Vizianagaram (IN); Venkata Vara Prasad Karri, Visakhapatnam (IN); Akash U. Dhoot, Pune (IN); Nitika Sharma, Punjab (IN); Poorna Vadada, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/452,464

(22) Filed: Oct. 27, 2021

(51) Int. Cl.
*G06F 15/16* (2006.01)
*H04L 67/131* (2022.01)
(Continued)

(52) U.S. Cl.
CPC .......... *H04L 67/131* (2022.05); *H04L 65/403* (2013.01); *H04L 67/54* (2022.05); *H04L 67/55* (2022.05)

(58) Field of Classification Search
CPC ..... H04L 67/131; H04L 65/403; H04L 67/54; H04L 67/55
(Continued)

(56) References Cited

U.S. PATENT DOCUMENTS 10,062,354 B2 * 8/2018 Dutt .................. G06F 9/455
10,488,918 B2 * 11/2019 Smith ................ G06F 3/017
(Continued)

FOREIGN PATENT DOCUMENTS

WO WO-2005015880 A1 * 2/2005 ............ G06Q 30/06
WO WO-2016145443 A1 * 9/2016 ........... G06T 19/006
(Continued)

OTHER PUBLICATIONS

Disclosed Anonymously, "Method and System for Dynamic Positioning and Splitting of Augmented Reality (AR) Objects to Enable Obstacle Free Surrounding During Interaction", IP.com No. IPCOM000259932D, Sep. 30, 2019, 5 Pages.
(Continued)

*Primary Examiner* — Moustafa M Meky
*Assistant Examiner* — Thorne E Waugh
(74) *Attorney, Agent, or Firm* — Robert R. Aragona (57) ABSTRACT

An embodiment for managing a real and virtual world is provided. The embodiment may include receiving a data stream of a virtual reality (VR) environment. The embodiment may also include identifying one or more users in the VR environment. The embodiment may further include analyzing one or more interactions of the one or more users in the VR environment. The embodiment may also include identifying at least one user who left the VR environment. The embodiment may further include in response to determining an action is required of the at least one user, presenting a notification to the at least one user that left the VR environment whose action is required. The embodiment may also include executing a response to the notification from the at least one user.

17 Claims, 7 Drawing Sheets

(51) Int. Cl.
  *H04L 65/403* (2022.01)
  *H04L 67/54* (2022.01)
  *H04L 67/55* (2022.01)
(58) Field of Classification Search
  USPC .......................................................... 709/204
  See application file for complete search history.

(56) References Cited

U.S. PATENT DOCUMENTS

| | | | |
|---|---|---|---|
| 10,503,964 B1* | 12/2019 | Valgardsson | G06T 19/006 |
| 10,595,012 B2 | 3/2020 | Ross | |
| 11,412,011 B1* | 8/2022 | Benjamin | H04L 67/02 |
| 11,435,593 B1* | 9/2022 | Sztuk | G02B 6/28 |
| 11,456,887 B1* | 9/2022 | McCracken | H04N 7/157 |
| 2009/0089439 A1 | 4/2009 | Benco | |
| 2009/0210483 A1 | 8/2009 | Pierce | |
| 2012/0192088 A1 | 7/2012 | Sauriol | |
| 2013/0116044 A1* | 5/2013 | Schwartz | A63F 13/12 463/29 |
| 2014/0213372 A1* | 7/2014 | Liang | A63F 13/2145 463/43 |
| 2018/0063576 A1* | 3/2018 | Tillman | G11B 27/031 |
| 2020/0169586 A1* | 5/2020 | Wang | G06F 3/011 |
| 2020/0276503 A1* | 9/2020 | Marchiorello | G06F 3/013 |
| 2021/0209676 A1* | 7/2021 | Deol | G02B 27/0093 |
| 2021/0286501 A1* | 9/2021 | Berquam | G06F 3/011 |
| 2022/0092498 A1* | 3/2022 | Patnaikuni | G06Q 10/063116 |
| 2022/0224584 A1* | 7/2022 | Castelli | H04L 67/131 |

FOREIGN PATENT DOCUMENTS

| | | | | |
|---|---|---|---|---|
| WO | 2020099251 A1 | | 5/2020 | |
| WO | 2021009412 A1 | | 1/2021 | |
| WO | WO-2022146898 A1 | * | 7/2022 | ............ H04L 51/10 |

OTHER PUBLICATIONS

Huilgol, "Top 4 Sentence Embedding Techniques Using Python!", Analytics Vidhya, Aug. 25, 2020, 27 pages. https://www.analyticsvidhya.com/blog/2020/08/top-4-sentence-embedding-techniques-using-python/.

Perera, "13 Stream Processing Patterns for Building Streaming and Realtime Applications", Aug. 3, 2015, 10 Pages. https://iwringer.wordpress.com/2015/08/03/patterns-for-streaming-realtime-analytics/.

Rzayev, "Notification in VR: The Effect of Notification Placement, Task, and Environment", Copyright 2019, 14 Pages, https://www.researchgate.net/publication/336708323_Notification_in_VR_The_Effect_of_Notification_Placement_Task_and_Environment.

Mell et al., "The NIST Definition of Cloud Computing", Recommendations of the National Institute of Standards and Technology, NIST Special Publication 800-145, Sep. 2011, 7 pages.

International Searching Authority, "Notification of Transmittal of the international Search Report and the Written Opinion of the International Searching Authority, or Declaration," Patent Cooperation Treaty, dated Oct. 25, 2022, 9 pages, International Application No. PCT/CN2022/127264.

* cited by examiner

REAL AND VIRTUAL WORLD MANAGEMENT

BACKGROUND

The present invention relates generally to the field of computing, and more particularly to a system for managing a real and virtual world.

Virtual reality (VR) devices and software have become popular in recent memory for both consumers and businesses. These devices and software may include VR headsets, as well as VR gaming and socializing applications, respectively. Such VR devices and software may allow a user to simply gaze through the VR headset at a real-world surrounding environment or interact with several other users and display a completely virtual (e.g., fictional) or enhanced version of that real-world surrounding environment. As technology continues to improve and influence the daily interactions individuals have with each other, the demand for VR devices and software is expected to increase in the coming years.

SUMMARY

According to one embodiment, a method, computer system, and computer program product for managing a real and virtual world is provided. The embodiment may include receiving a data stream of a virtual reality (VR) environment. The embodiment may also include identifying one or more users in the VR environment. The embodiment may further include analyzing one or more interactions of the one or more users in the VR environment. The embodiment may also include identifying at least one user who left the VR environment. The embodiment may further include in response to determining an action is required of the at least one user based on the one or more interactions, presenting a notification to the at least one user that left the VR environment whose action is required. The notification may be presented via an IoT device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for managing a real and virtual world. The following described exemplary embodiments provide a system, method, and program product to, among other things, determine whether an action is required of any user who left a virtual reality (VR) environment and, accordingly, present a notification to each user that left the VR environment whose action is required. Therefore, the present embodiment has the capacity to improve the technical field of VR by enhancing the capabilities of VR devices such that users who exit the VR environment are still able to remain involved in the happenings of the VR environment.

As previously described, VR devices and software have become popular in recent memory for both consumers and businesses. These devices and software may include VR headsets, as well as VR gaming and socializing applications, respectively. Such VR devices and software may allow a user to simply gaze through the VR headset at a real-world surrounding environment or interact with several other users and display a completely virtual (e.g., fictional) or enhanced version of that real-world surrounding environment. As technology continues to improve and influence the daily interactions individuals have with each other, the demand for VR devices and software is expected to increase in the coming years. It is often difficult to notify a user that left a first VR environment for a real-world environment or a second VR environment whose attention is required in the first VR environment. For example, a user may leave a first VR environment and another user who is still in the first VR environment may invoke the name of the user who left. This problem is typically addressed by notifying the user who left the first VR environment when that user returns to the first VR environment. However, notifying the user who left when that user returns to the first VR environment requires other users to have to wait for the user to return and fails to account for actions that require immediate attention. It may therefore be imperative to have a system in place to notify a user who left a VR environment while the user is outside of that VR environment so that other users do not have to wait for the user to return. Thus, embodiments of the present invention may provide advantages including, but not limited to, notifying a user who left a VR environment while the user is outside of that VR environment, enabling a user to simultaneously perform tasks in a VR environment and a real-world environment, and seamlessly switching between multiple VR environments. The present invention does not require that all advantages need to be incorporated into every embodiment of the invention.

According to at least one embodiment, when a user is participating in a VR environment, a data stream of the VR environment may be received. According to at least one embodiment, the VR environment may be a collaborative VR environment in which multiple users interact with each other. According to at least one other embodiment, the VR environment may be an activity-based VR environment in which a user interacts with one or more virtual objects. Upon receiving the data stream, one or more users in the VR environment may be identified in order to analyze one or more interactions of the one or more users in the VR environment. At least one user who left the VR environment may be identified in order to determine whether an action is required of the at least one user based on the one or more interactions. In response to determining the action is required of the at least one user, a notification may be presented to the at least one user that left the VR environment whose action is required. The notification may be presented via an IoT device and a response to the notification from the at least one user may be executed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine whether an action is required of any user who left a VR environment and, accordingly, present a notification to each user that left the VR environment whose action is required.

Figure 1:
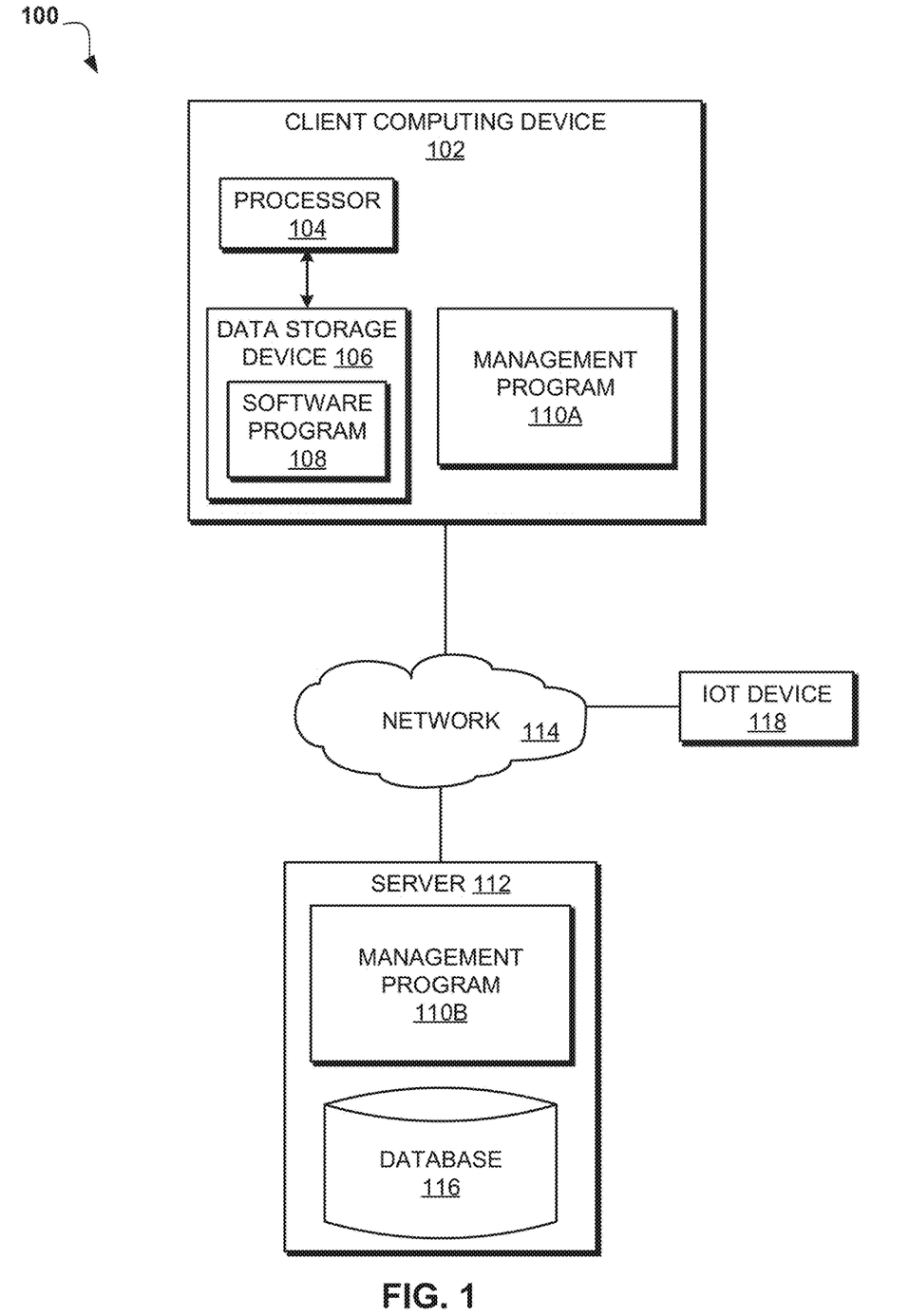
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a management program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a management program 110B and a database 116 and communicating with the client computing device 102 and IoT Device 118 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 includes a VR device, such as a VR headset, an AR device, such as smart glasses, smart contact lenses, and/or any other VR or AR devices known in the art for enhancing the user's visual surroundings that is capable of connecting to the communication network 114, and transmitting and receiving data with the client computing device 102 and the server 112.

According to the present embodiment, the management program 110A, 110B may be a program capable of receiving a data stream of a VR environment, determining whether an action is required of any user who left the VR environment, presenting a notification to each user that left the VR environment whose action is required, notifying a user who left the VR environment while the user is outside of that VR environment, enabling a user to simultaneously perform tasks in a VR environment and a real-world environment, and seamlessly switching between multiple VR environments. The real and virtual world management method is explained in further detail below with respect to FIG. 2.

Figure 2:
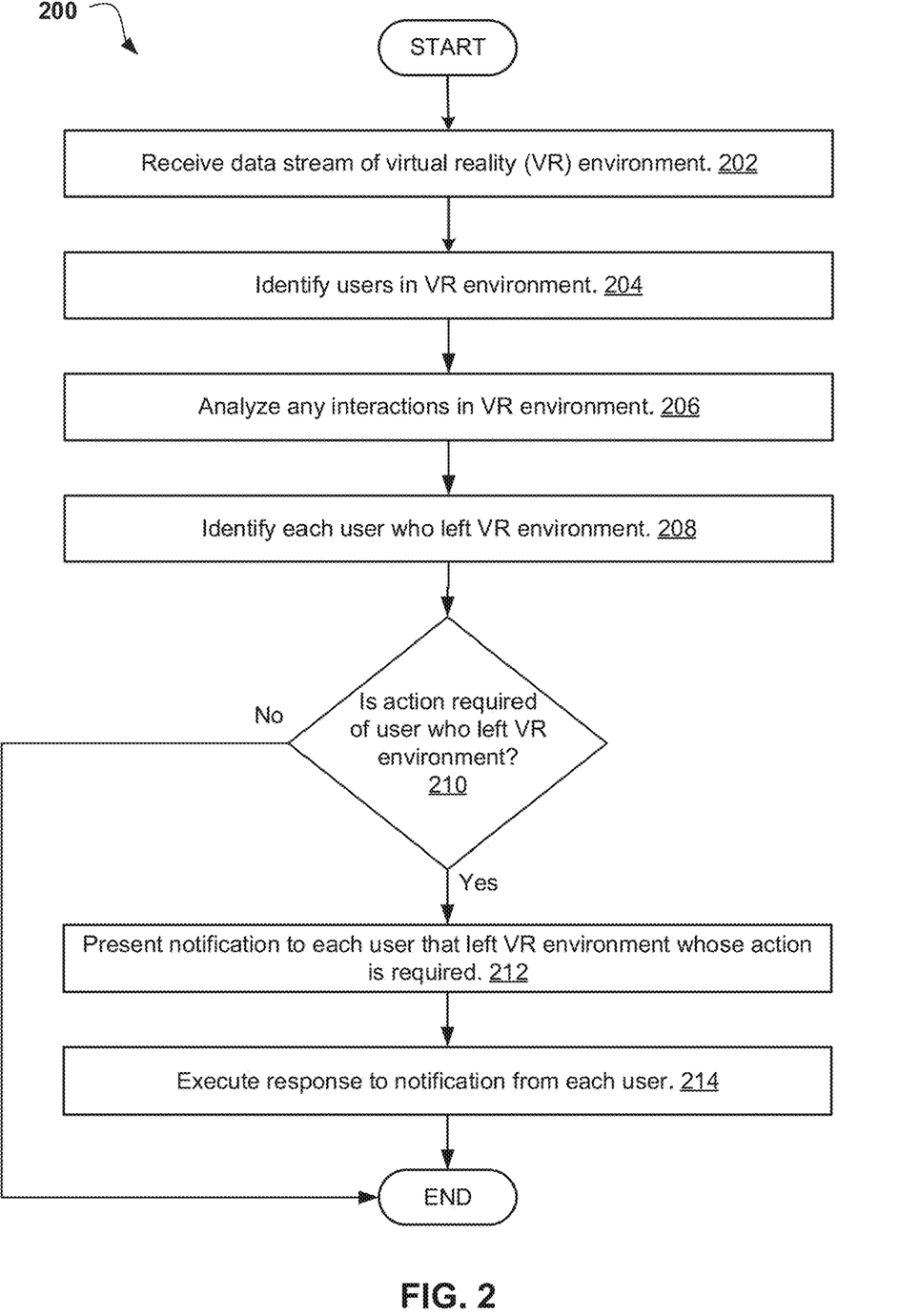
FIG. 2 illustrates an operational flowchart for managing a real and virtual world in a real and virtual world management process according to at least one embodiment.

Referring now to FIG. 2, an operational flowchart for managing a real and virtual world in a real and virtual world management process 200 is depicted according to at least one embodiment. At 202, the management program 110A, 110B receives the data stream of the VR environment. Using the software program 108 on the client computing device 102, the data stream may be received. The one or more users may access the VR environment through the IoT Device 118, such as the VR headset. As described above, the IoT Device 118 may also include the AR device, such as smart glasses, smart contact lenses, and/or any other VR or AR devices known in the art for enhancing the user's visual surroundings.

Figure 3:
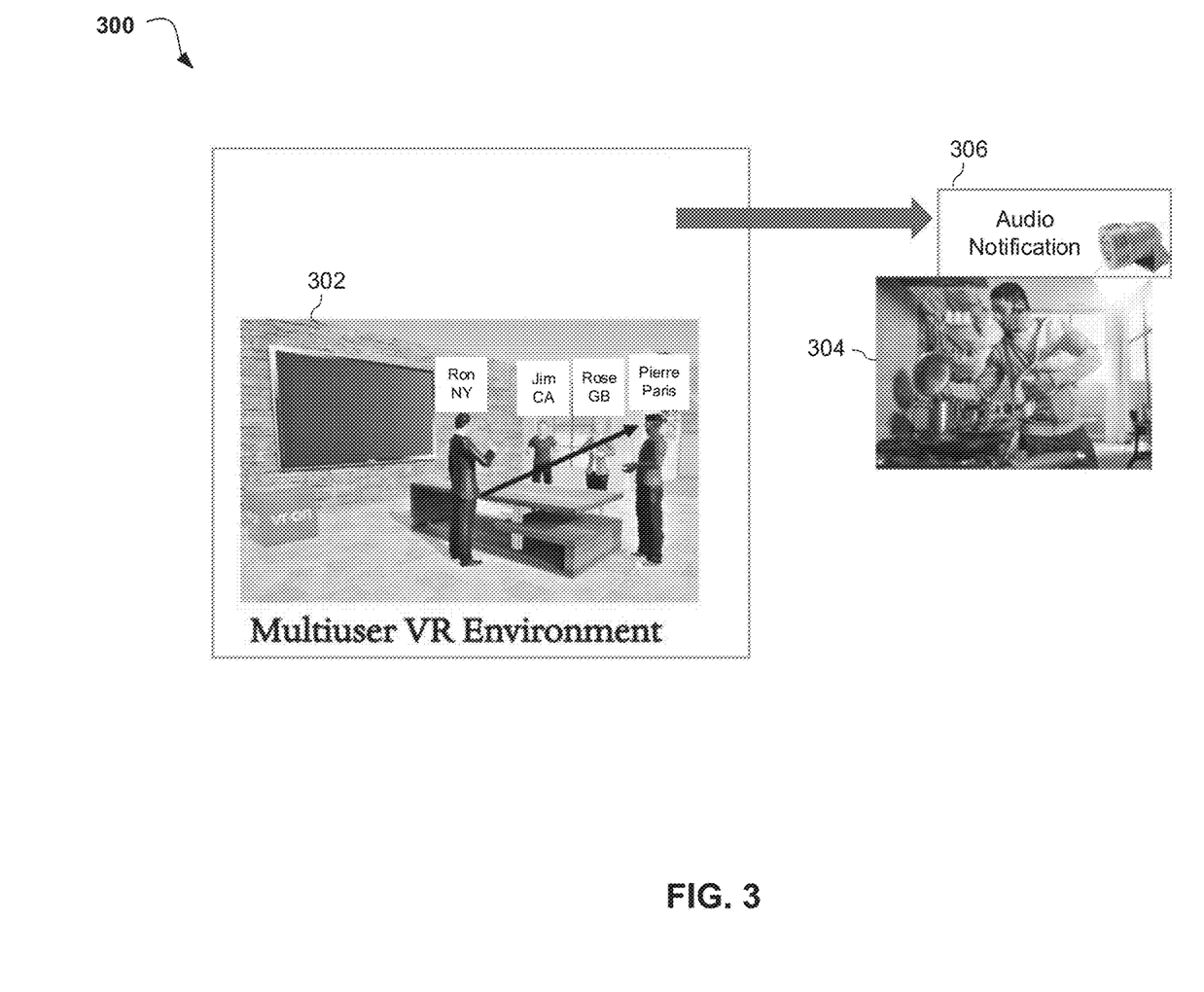
FIG. 3 is a diagram depicting an exemplary collaborative virtual reality (VR) environment according to at least one embodiment.

According to at least one embodiment, the VR environment may be the collaborative VR environment in which multiple users interact with each other. For example, several users may be communicating with each other in a virtual collaborative online meeting, as illustrated in FIG. 3. The collaborative VR environment is described in further detail below with respect to FIG. 3.

Figure 4:
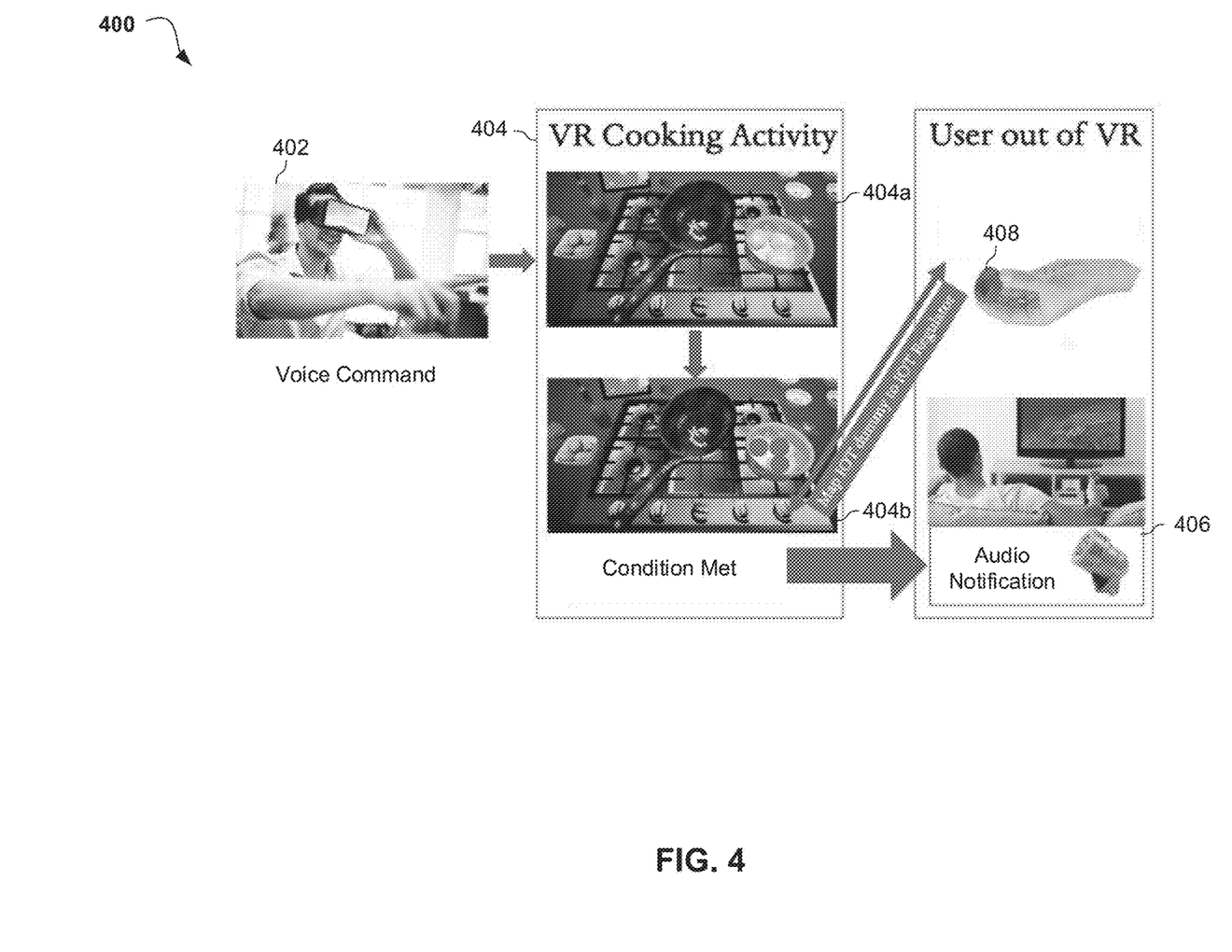
FIG. 4 is a diagram depicting an exemplary activity-based VR environment according to at least one embodiment.

According to at least one other embodiment, the VR environment may be the activity-based VR environment in which the user interacts with the one or more virtual objects. For example, the user may be participating in a virtual cooking activity, as illustrated in FIG. 4. The activity-based VR environment is described in further detail below with respect to FIG. 4.

Then, at 204, the management program 110A, 110B identifies the one or more users in the VR environment. As used herein, a "user" is a participant in the VR environment. According to at least one embodiment, the one or more users may be identified from an avatar in the VR environment that may be associated with each user. For example, and as illustrated in FIG. 3, the name and location of the one or more users may be displayed above the avatars. According to at least one other embodiment, the one or more users may be identified from a user profile in an online account. For example, prior to joining the VR environment, the one or more users may be required to create a profile which may include names, dates of birth, telephone numbers, and/or email addresses of the one or more users. It may be appreciated that the examples described above are not intended to be limiting, and that in embodiments of the present invention the one or more users in the VR environment may be identified in a variety of different ways.

Next, at 206, the management program 110A, 110B analyzes the one or more interactions of the one or more users in the VR environment. Upon receiving the data stream of the VR environment described above with respect to step 202, the management program 110A, 110B may continuously monitor the VR environment for the one or more interactions.

According to at least one embodiment, the one or more interactions in the VR environment may be interactions between the multiple users in the VR environment. For example, in a virtual collaborative online meeting, the users may be interacting with each other verbally. Continuing the example, in addition to interacting with each other verbally, the users may be interacting with each other non-verbally as well, such as with facial and/or hand gestures (e.g., nodding one's head and/or pointing one's finger).

According to at least one other embodiment, the one or more interactions in the VR environment may be an interaction between the user and the one or more virtual objects in the VR environment. For example, in a video game VR environment, the user may be interacting with the one or more virtual objects in the field of view of the user using a controller, facial gestures, and/or hand gestures. Continuing the example, in a virtual tennis match, the virtual objects may be a tennis ball and a racket. In another example, described above with respect to step 202, the user may be participating in a virtual cooking activity. In this example, the user may be interacting with the one or more virtual objects in the field of view of the user also using a controller, facial gestures, and/or hand gestures. Continuing the example, the virtual objects may be a stovetop, a stove regulator, a cooking pan, and/or a food item (e.g., potatoes).

In either of the embodiments described above, the one or more interactions in the VR environment may also be a voice command from the user specifying a condition. For example, the voice command may be, "Please notify me when the potatoes turn yellow" or "Please notify me when someone in the meeting hands me a document." The voice commands are described in further detail below with respect to step 210.

Then, at 208, the management program 110A, 110B identifies the at least one user of the one or more users who left the VR environment. According to at least one embodiment, the at least one user who left the VR environment may be identified based on a detected interaction of the one or more users with a real-world environment. As used herein, a "real-world environment" means a natural environment (i.e., a non-virtual environment). Continuing the example above where the user is in a virtual tennis match, the user may pick up a phone that is ringing in the real-world environment. The management program 110A, 110B may detect that the user answered the phone and thus left the VR environment. In another example, the user may step outside and go for a jog. Similarly, the management program 110A, 110B may detect that the user is exercising and thus left the VR environment. The management program 110A, 110B may utilize the AR devices described above to detect the interaction in the real-world environment. For example, the user may remove the VR headset, put on the AR glasses, and then perform an interaction with the real-world environment.

According to at least one other embodiment, the at least one user who left the VR environment may be identified based on the voice command from the user specifying the condition described above with respect to step 206. For example, if the user says, "Please notify me when the potatoes turn yellow," the management program 110A, 110B may presume that the user who spoke the voice command intends to leave the VR environment at any moment. Continuing the example, if the user does not issue another voice command within a pre-determined time period (e.g., 10 seconds), the management program 110A, 110B may determine the user has left the VR environment.

Then, at 210, the management program 110A, 110B determines whether the action is required of the at least one user who left the VR environment. The determination is made based on the one or more interactions in the VR environment described above with respect to step 206. According to at least one embodiment, as described above, the one or more interactions in the VR environment may be interactions between the multiple users in the VR environment. For example, in a virtual collaborative online meeting, the users may be interacting with each other verbally. Continuing the example, in addition to interacting with each other verbally, the users may be interacting with each other non-verbally as well, such as with facial and/or hand gestures (e.g., nodding one's head and/or pointing one's finger). In this embodiment, the interaction may be one user calling on another user to participate. For example, Ron may say, "Jim, can you present the sales report to the group for third quarter?" In another example, the interaction may be a hand gesture. Continuing the example, Ron may wrap up a presentation and then point to Jim, indicating that it is Jim's turn to participate. Based on these interactions, the management program 110A, 110B may determine that an action is required of Jim. Additionally, in this embodiment, the interaction may also be the voice command from the user specifying the condition. For example, the voice command from Jim may be, "Please notify me when Ron indicates it is my turn to participate." Once Ron calls on Jim, either by name or by pointing to Jim, the management program 110A, 110B may determine that an action is required of Jim.

According to at least one other embodiment, as described above, the one or more interactions in the VR environment may be an interaction between the user and the one or more virtual objects in the VR environment. For example, in a video game VR environment, the user may be interacting with the one or more virtual objects in the field of view of the user using a controller, facial gestures, and/or hand gestures. Continuing the example, in a virtual tennis match, the virtual objects may be a tennis ball and a racket. In another example, described above with respect to step 202, the user may be participating in a virtual cooking activity. In this example, the user may be interacting with the one or more virtual objects in the field of view of the user also using a controller, facial gestures, and/or hand gestures. Continuing the example, the virtual objects may be a stovetop, a stove regulator, a cooking pan, and/or a food item (e.g., potatoes. In this embodiment, the interaction may also be the voice command from the user specifying the condition. For example, the voice command from Tim may be, "Please notify me when the potatoes turn yellow." Once the condition is met (i.e., the potatoes turn yellow), the management program 110A, 110B may determine that an action is required of Tim.

According to at least one further embodiment, the determination may be made based on a probability that an action is required of the at least one user who left the VR environment. In this embodiment, the management program 110A, 110B may gather historical data from prior VR environments to identify an order in which each of the users normally participates. Continuing the example above in the virtual collaborative online meeting, if a pattern can be detected by the management program 110A, 110B that Jim normally participates immediately after Ron, the management program 110A, 110B may determine that an action is required of Jim in advance (i.e., prior to Jim being called on to participate).

In response to determining the action is required of the at least one user (step 210, "Yes" branch), the real and virtual world management process 200 proceeds to step 212 to present the notification to the at least one user that left the VR environment whose action is required. In response to determining the action is not required of the at least one user (step 210, "No" branch), the real and virtual world management process 200 ends.

Next, at 212, the management program 110A, 110B presents the notification to the at least one user that left the VR environment whose action is required. The notification is presented via the IoT Device 118, such as the AR glasses. Examples of the notification include, but are not limited to, a push notification, an alarm, a buzzer, an audio notification, and/or a video notification indicating that the action is required of the user. The notification may additionally indicate the particular action required of the at least one user. For example, the buzzer may vibrate and the audio notification may be, "Ron has indicated that he would like you to present the sales report to the group for third quarter." If the at least one user issued a voice command specifying a condition, the notification may be presented to the at least one user whose action is required when the condition specified is met. In embodiments of the present invention where the management program 110A, 110B gathers historical data from prior VR environments to identify an order in which each of the users normally participates, the notification may be presented to the at least one user whose action is required in advance of the required action. For example, the alarm may sound and the audio notification may be, "Jim, it will be your turn to participate in approximately five minutes." It may be appreciated that the examples described above are not intended to be limiting, and that in embodiments of the present invention the notification may be presented in a variety of different ways.

According to at least one embodiment, the management program 110A, 110B may assess the one or more interactions in the VR environment and tag an activity criticality score to each action that is required of the at least one user who left the VR environment. Examples of an activity criticality score include, but are not limited to, "high priority," "medium priority," and "low priority." The activity criticality score tagged to an action may be pre-determined based on the at least one user's role in the VR environment. For example, in a virtual hospital environment, an action required of a doctor may be tagged with a "high priority" activity criticality score. In another example, such as in a virtual cooking environment, an action required of the cook may be tagged with a "medium priority" activity criticality score. The activity criticality score tagged to an action may also be presented to the at least one user along with the notification. Continuing the example above, the alarm may sound and the audio notification may be, "Jim, it will be your turn to participate in approximately five minutes. This is a medium priority action."

According to at least one other embodiment, the push notification and/or video notification may be presented to the user in different colors, in which the color indicates the activity criticality score. For example, if the notification is presented in red, the red notification may indicate the action is tagged with a "high priority" criticality score. If the notification is presented in yellow, the yellow notification may indicate the action is tagged with a "medium priority" criticality score. If the notification is presented in green, the green notification may indicate the action is tagged with a "low priority" criticality score. It may be appreciated that the examples described above are not intended to be limiting, and that in embodiments of the present invention the notification may be presented in a variety of different colors.

Then, at 214, the management program 110A, 110B executes the response to the notification from the at least one user. According to at least one embodiment, the at least one user who left the VR environment whose action is required may respond to the notification by requesting a visual excerpt of an interaction of the one or more interactions that determined the action is required of the at least one user. In response to the request, the management program 110A, 110B may create the visual excerpt of the interaction of the one or more interactions that determined the action is required of the at least one user and present the visual excerpt via the IoT Device 118, such as the AR glasses. For example, the visual excerpt may be a textual transcript of the interaction presented to the at least one user as a digital overlay on the real-world environment (e.g., an overlayed textual transcript reading, "Jim, can you present the sales report to the group for third quarter?"). In another example, the visual excerpt may be a recorded video of the interaction presented to the at least one user as a digital overlay on the real-world environment (e.g., an overlayed recorded video of Ron saying, "Jim, can you present the sales report to the group for third quarter?").

In this embodiment, upon assessing the one or more interactions in the VR environment and tagging an activity criticality score to each action that is required of the at least one user who left the VR environment, the management program 110A, 110B may present a suggested response, via the AR device, to the at least one user who left the VR environment whose action is required. In this embodiment, the suggested response does not require the at least one user to rejoin the VR environment. Rather, the suggested response indicates actions that may be taken while the user remains in the real-world environment. The suggested response may be based on the activity criticality score tagged to each action that is required of the at least one user who left the VR environment. For example, if the action is tagged with a "high priority" criticality score, the suggested response may be for the at least one user to record a video and/or audio clip satisfying the required action (e.g., the at least one user completing their portion of the presentation). In another example, if the action is tagged with a "medium priority" criticality score, the suggested response may be for the at least one user to pause the VR environment (e.g., pause the virtual cooking activity when the potatoes turn yellow). In yet another example, if the action is tagged with a "low priority" criticality score, the suggested response may be for the at least one user to inform the users who are still in the VR environment to wait for the at least one user to return (e.g., wait until the at least one user is finished interacting with the real-world environment).

According to at least one other embodiment, the at least one user who left the VR environment whose action is required may respond to the notification by exiting the real-world environment and rejoining the VR environment. For example, when presented with the notification that the potatoes have turned yellow, the at least one user may indicate via voice that the at least one user would like to switch the context from the real-world environment to the VR environment.

According to at least one further embodiment, the at least one user who left the VR environment whose action is required may respond to the notification by interacting with a physical object in the real-world environment. Upon receiving the notification, the at least one user may pick up the physical object in the real-world environment and the management program 110A, 110B may utilize computer vision techniques to map the physical object to a virtual object in the VR environment. For example, a circular knob in the real-world environment may be mapped to a cooktop regulator in the VR environment. Using the physical object to control the virtual object is described in further detail below with respect to FIG. 4.

Referring now to FIG. 3, a diagram 300 depicting an exemplary collaborative VR environment is shown according to at least one embodiment. In the diagram 300, a multiuser VR environment 302 is illustrated. The avatars in the multiuser VR environment 302 may have names and locations of the users to whom the avatars are associated displayed above the avatars. For example, the names and locations may be Ron in New York, Jim in California, Rose in Great Britain, and Pierre in Paris. Pierre may step out of the VR environment and return to the real-world environment 304. In the real-world environment 304, Pierre may be cooking a meal. Once Ron calls on Pierre to present, the audio notification 306 may be presented to Pierre to inform Pierre that an action is required. According to at least one embodiment, as described above, if a pattern can be detected based on historical data that Pierre normally participates immediately after Ron, the management program 110A, 110B may determine that the action is required of Pierre in advance (i.e., prior to Pierre being called on to participate). Thus, in the multiuser VR environment 302, the notification may be presented to the at least one user whose action is required in advance of the required action.

Referring now to FIG. 4, a diagram 400 depicting an exemplary activity-based VR environment is shown according to at least one embodiment. In the diagram 400, the at least one user issues a voice command 402 while participating in a VR cooking activity 404. For example, in the VR cooking activity 404 the issued voice command 402 may be, "Let me know when these potatoes turn yellow." The at least one user may issue the voice command 402 at the beginning 404a of the VR cooking activity 404 and when the condition is met 404b (i.e., the potatoes turn yellow), the audio notification 406 may be presented to the at least one user in the real-world environment that an action is required. Thus, in the activity-based VR environment, the notification may be presented to the at least one user whose action is required when a condition specified by the at least one user is met.

In response to the audio notification 406, the at least one user may pick up the physical object 408 in the real-world environment. Utilizing computer vision techniques, the management program 110A, 110B may map the physical object 408 to a virtual object in the VR cooking activity 404. For example, the physical object 408 may be a circular knob in the real-world environment and the circular knob may be mapped to a cooktop regulator in the VR cooking activity 404. Continuing the example, the at least one user may then turn the physical object 408 counterclockwise to lower the temperature of the virtual cooktop, and turn the physical object 408 clockwise to raise the temperature of the virtual cooktop.

It may be appreciated that FIGS. 2-4 provide only an illustration of one implementation and do not imply any limitations with regard to how different embodiments may be implemented. Many modifications to the depicted environments may be made based on design and implementation requirements.

Figure 5:
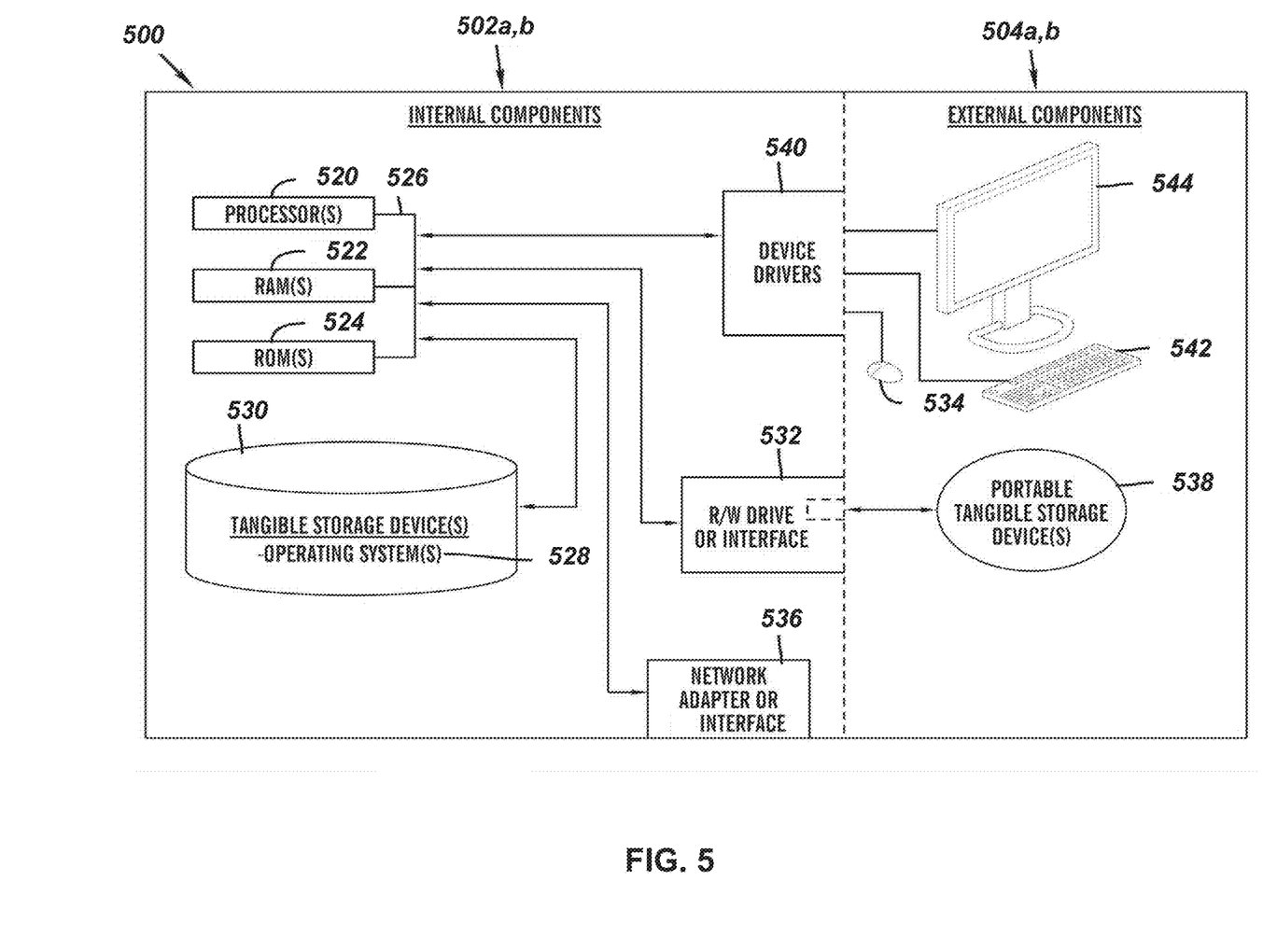
FIG. 5 is a functional block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the management program 110A in the client computing device 102 and the management program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the management program 110A, 110B, can be stored on one or more of the respective portable computer-readable tangible storage devices 538, read via the respective R/W drive or interface 532, and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 and the management program 110A in the client computing device 102 and the management program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the management program 110A in the client computing device 102 and the management program 110B in the server 112 are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
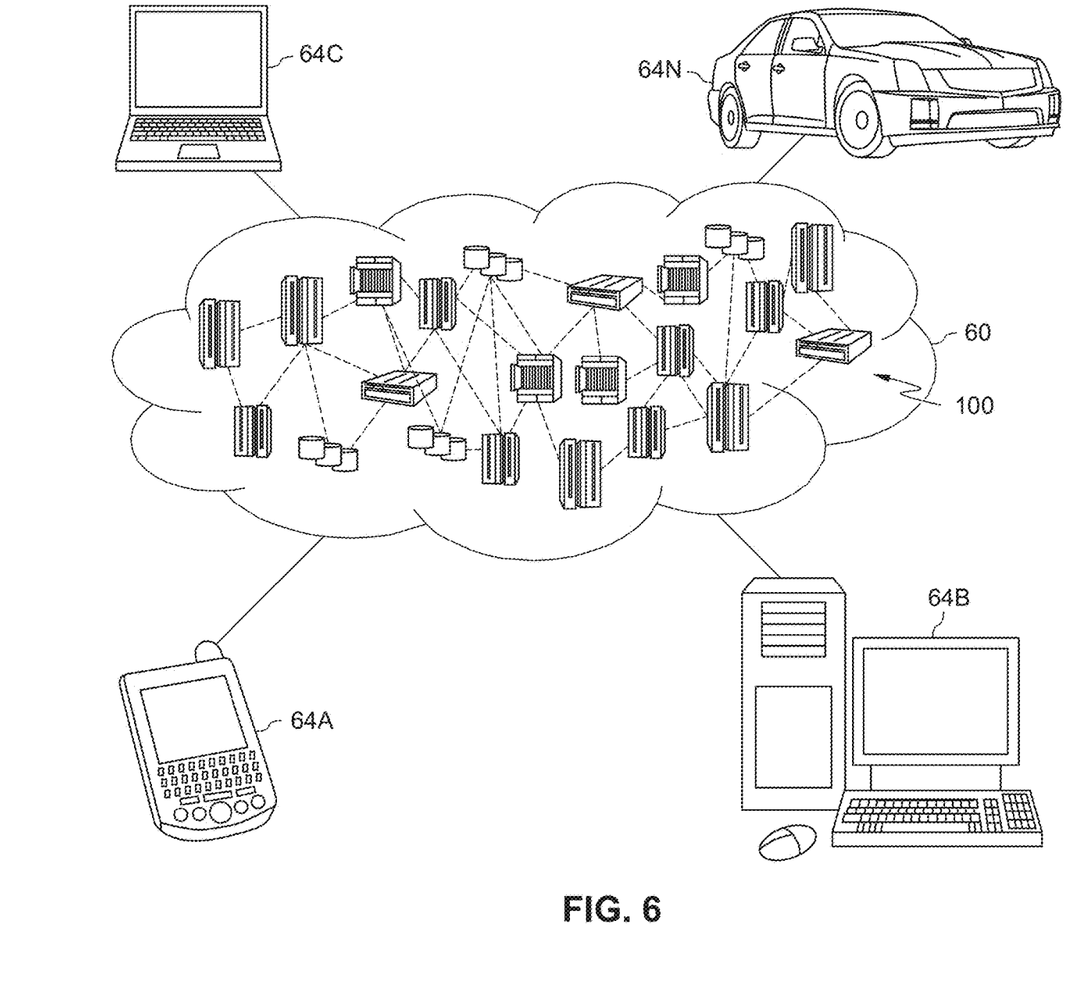
FIG. 6 depicts a cloud computing environment according to an embodiment of the present invention.

Referring now to FIG. 6, illustrative cloud computing environment 60 is depicted. As shown, cloud computing environment 60 comprises one or more cloud computing nodes 100 with which local computing devices used by cloud consumers, such as, for example, personal digital assistant (PDA) or cellular telephone 64A, desktop computer 64B, laptop computer 64C, and/or automobile computer system 64N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 60 to offer infrastructure, platforms and/or software as services for which a cloud consumer does not need to maintain resources on a local computing device. It is understood that the types of computing devices 64A-N shown in FIG. 6 are intended to be illustrative only and that computing nodes 100 and cloud computing environment 60 can communicate with any type of computerized device over any type of network and/or network addressable connection (e.g., using a web browser).

Figure 7:
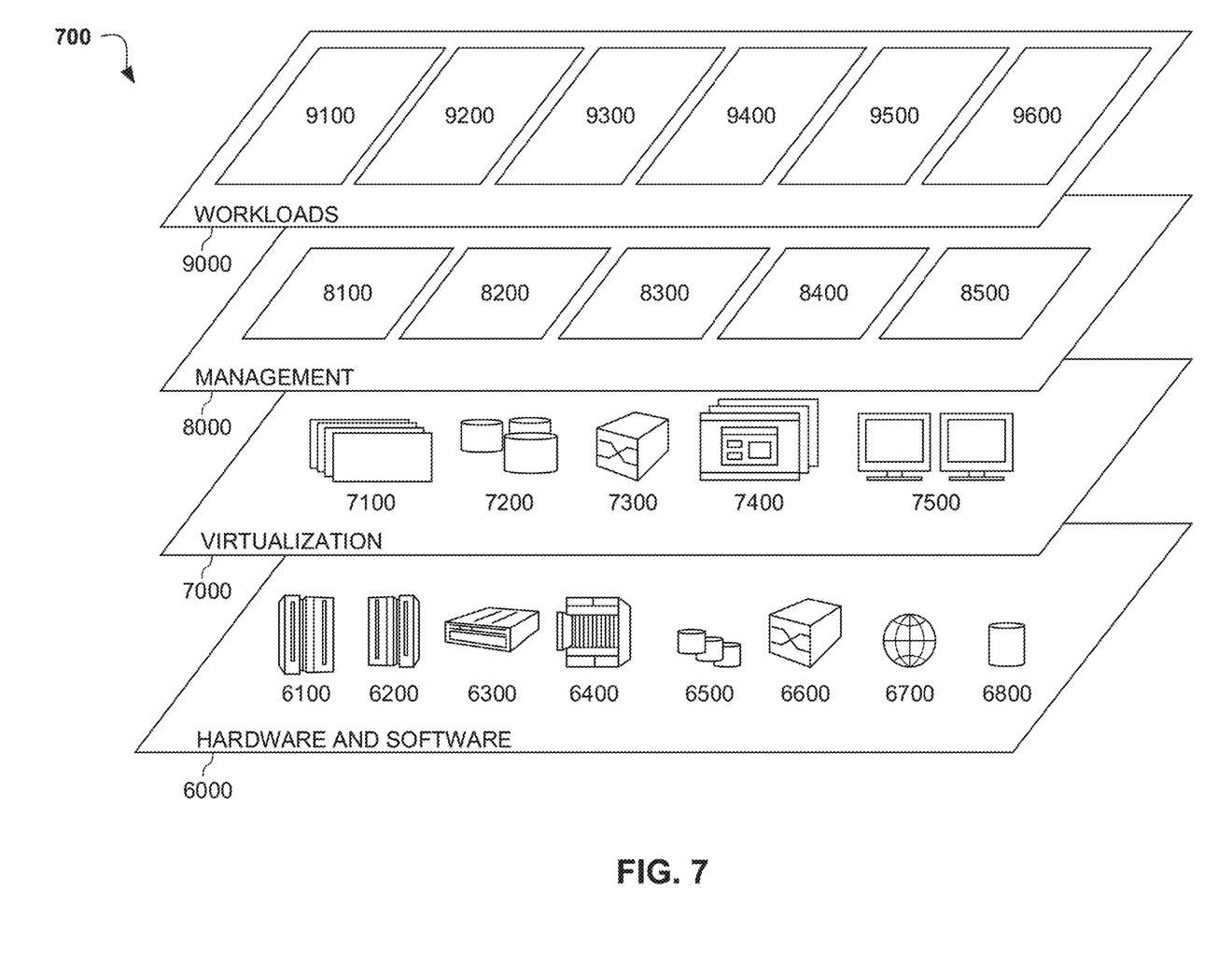
FIG. 7 depicts abstraction model layers according to an embodiment of the present invention.

Referring now to FIG. 7, a set of functional abstraction layers 700 provided by cloud computing environment 60 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 6000 includes hardware and software components. Examples of hardware components include: mainframes 6100; RISC (Reduced Instruction Set Computer) architecture based servers 6200; servers 6300; blade servers 6400; storage devices 6500; and networks and networking components 6600. In some embodiments, software components include network application server software 6700 and database software 6800.

Virtualization layer 7000 provides an abstraction layer from which the following examples of virtual entities may be provided: virtual servers 7100; virtual storage 7200; virtual networks 7300, including virtual private networks; virtual applications and operating systems 7400; and virtual clients 7500.

In one example, management layer 8000 may provide the functions described below. Resource provisioning 8100 provides dynamic procurement of computing resources and other resources that are utilized to perform tasks within the cloud computing environment. Metering and Pricing 8200 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 8300 provides access to the cloud computing environment for consumers and system administrators. Service level management 8400 provides cloud computing resource allocation and management such that required service levels are met. Service Level Agreement (SLA) planning and fulfillment 8500 provide pre-arrangement for, and procurement of, cloud computing resources for which a future requirement is anticipated in accordance with an SLA.

Workloads layer 9000 provides examples of functionality for which the cloud computing environment may be utilized. Examples of workloads and functions which may be provided from this layer include: mapping and navigation 9100; software development and lifecycle management 9200; virtual classroom education delivery 9300; data analytics processing 9400; transaction processing 9500; and managing a real and virtual world 9600. Managing a real and virtual world 9600 may relate to determining whether an action is required of any user who left a VR environment in order to present a notification to each user that left the VR environment whose action is required.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of managing a real and virtual world, the method comprising:
   receiving a data stream of a virtual reality (VR) environment;
   identifying one or more users in the VR environment;
   analyzing one or more interactions of the one or more users in the VR environment;
   identifying at least one user of the one or more users who left the VR environment;
   determining whether an action is required of the at least one user who left the VR environment based on the one or more interactions, wherein each action required of the at least one user is tagged with an activity criticality score in accordance with a role of the at least one user in the VR environment;
   in response to determining the action is required of the at least one user, presenting a notification, via an IoT device, to the at least one user that left the VR environment whose action is required; and
   executing a response to the notification from the at least one user, wherein executing the response further comprises:
      providing a suggested response to the at least one user indicating actions that are able to be performed by the user while the at least one user remains in a real-world environment based on the activity criticality score.

2. The computer-based method of claim 1, wherein the at least one user who left the VR environment is identified based on a detected interaction of the one or more users with a real-world environment.

3. The computer-based method of claim 1, wherein the notification is selected from a group consisting of a push notification, an alarm, a buzzer, and an audio notification.

4. The computer-based method of claim 1, wherein the VR environment is a collaborative VR environment in which the notification is presented to the at least one user whose action is required in advance of the required action.

5. The computer-based method of claim 1, wherein the VR environment is an activity-based VR environment in which the notification is presented to the at least one user whose action is required when a condition specified by the at least one user is met.

6. The computer-based method of claim 1, wherein executing the response to the notification further comprises:
   creating a visual excerpt of an interaction of the one or more interactions that determined the action is required of the at least one user; and
   presenting the visual excerpt via the IoT device.

7. A computer system, the computer system comprising:
   one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving a data stream of a virtual reality (VR) environment;

identifying one or more users in the VR environment;

analyzing one or more interactions of the one or more users in the VR environment;

identifying at least one user of the one or more users who left the VR environment;

determining whether an action is required of the at least one user who left the VR environment based on the one or more interactions, wherein each action required of the at least one user is tagged with an activity criticality score in accordance with a role of the at least one user in the VR environment;

in response to determining the action is required of the at least one user, presenting a notification, via an IoT device, to the at least one user that left the VR environment whose action is required; and executing a response to the notification from the at least one user, wherein executing the response further comprises:

provid­ing a suggested response to the at least one user indicating actions that are able to be performed by the user while the at least one user remains in a real-world environment based on the activity criticality score.

8. The computer system of claim 7, wherein the at least one user who left the VR environment is identified based on a detected interaction of the one or more users with a real-world environment.

9. The computer system of claim 7, wherein the notification is selected from a group consisting of a push notification, an alarm, a buzzer, and an audio notification.

10. The computer system of claim 7, wherein the VR environment is a collaborative VR environment in which the notification is presented to the at least one user whose action is required in advance of the required action.

11. The computer system of claim 7, wherein the VR environment is an activity-based VR environment in which the notification is presented to the at least one user whose action is required when a condition specified by the at least one user is met.

12. The computer system of claim 7, wherein executing the response to the notification further comprises:

creating a visual excerpt of an interaction of the one or more interactions that determined the action is required of the at least one user; and presenting the visual excerpt via the IoT device.

13. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving a data stream of a virtual reality (VR) environment;

identifying one or more users in the VR environment;

analyzing one or more interactions of the one or more users in the VR environment;

identifying at least one user of the one or more users who left the VR environment;

determining whether an action is required of the at least one user who left the VR environment based on the one or more interactions, wherein each action required of the at least one user is tagged with an activity criticality score in accordance with a role of the at least one user in the VR environment;

in response to determining the action is required of the at least one user, presenting a notification, via an IoT device, to the at least one user that left the VR environment whose action is required; and executing a response to the notification from the at least one user, wherein executing the response further comprises:

providing a suggested response to the at least one user indicating actions that are able to be performed by the user while the at least one user remains in a real-world environment based on the activity criticality score.

14. The computer program product of claim 13, wherein the at least one user who left the VR environment is identified based on a detected interaction of the one or more users with a real-world environment.

15. The computer program product of claim 13, wherein the notification is selected from a group consisting of a push notification, an alarm, a buzzer, and an audio notification.

16. The computer program product of claim 13, wherein the VR environment is a collaborative VR environment in which the notification is presented to the at least one user whose action is required in advance of the required action.

17. The computer program product of claim 13, wherein the VR environment is an activity-based VR environment in which the notification is presented to the at least one user whose action is required when a condition specified by the at least one user is met.

* * * * *